W. S. ARCHER.
Horse Hay-Rake.
No. 215,784. Patented May 27, 1879.
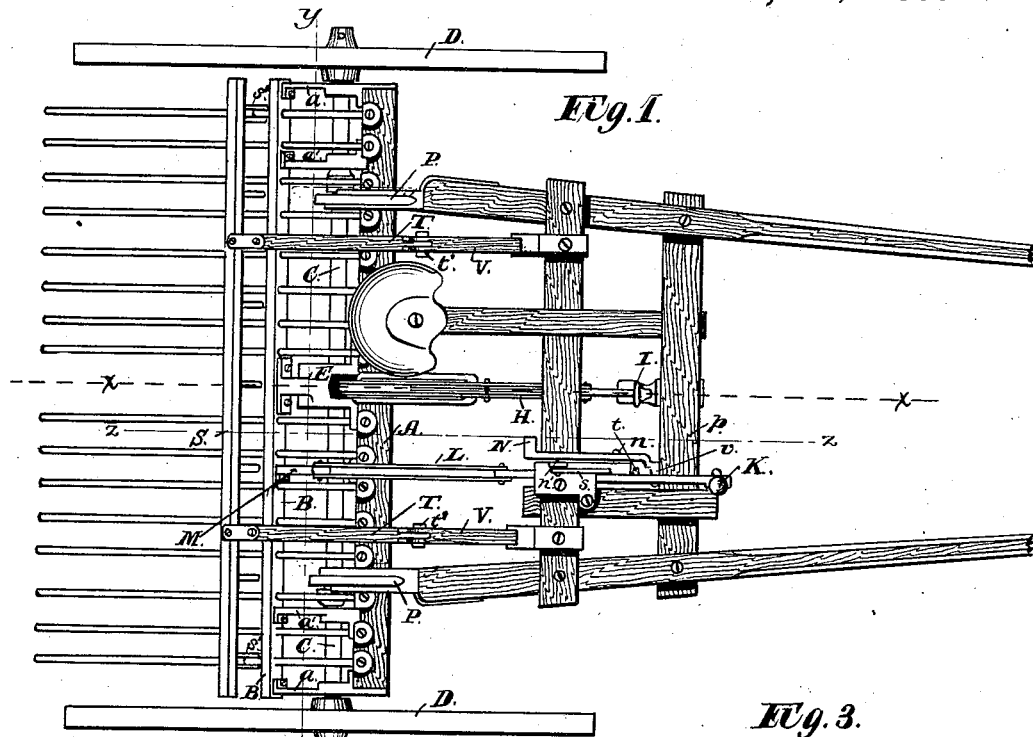
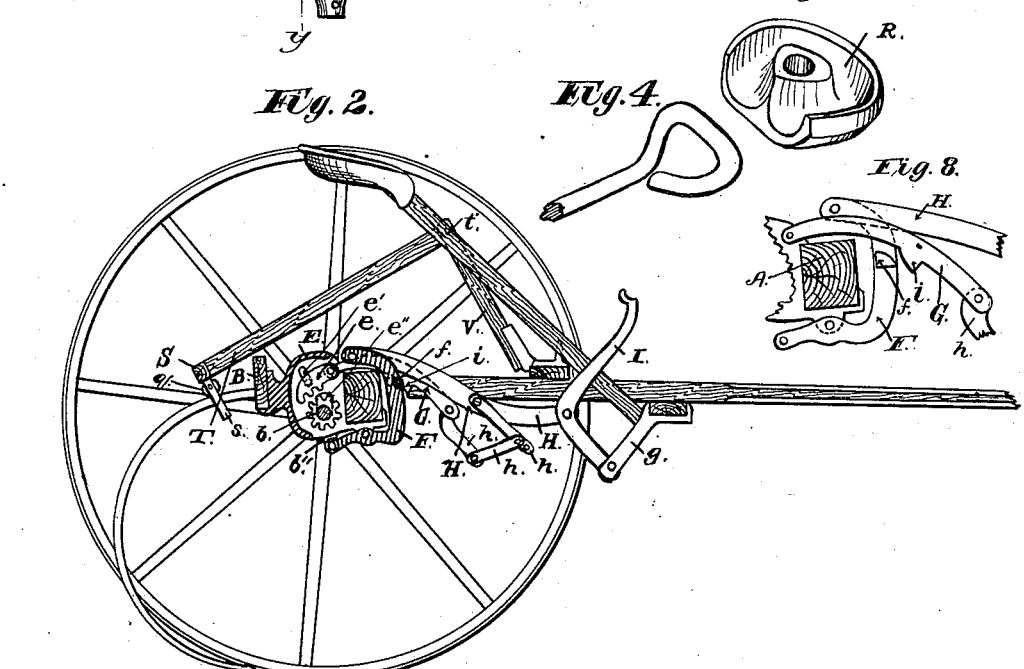
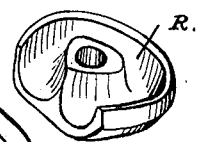
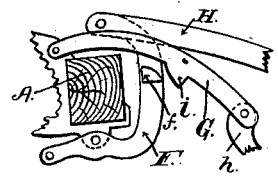
Witnesses:
Chas. M. Peck
Pat. H. Gunckel
Inventor
William S. Archer
by his Attys;
Peck & Ritchie 2 Sheets—Sheet 2.

W. S. ARCHER.
Horse Hay-Rake.

No. 215,784. Patented May 27, 1879.

Witnesses:
Chas. M. Peck
P. H. Guncrel

Inventor:
William S. Archer
by his Attys
Peck & Ritchie

UNITED STATES PATENT OFFICE.

WILLIAM S. ARCHER, OF DAYTON, OHIO.

IMPROVEMENT IN HORSE HAY-RAKES.

Specification forming part of Letters Patent No. 215,784, dated May 27, 1879; application filed December 10, 1878.

*To all whom it may concern:*

Be it known that I, WILLIAM S. ARCHER, of Dayton, in the county of Montgomery and State of Ohio, have invented certain new and useful Improvements in Horse Hay-Rakes; and I do hereby declare the following to be a full, clear, and exact description of the same.

My invention relates to that class of horse hay-rakes in which the rotation of the supporting-wheels causes the teeth to be elevated to discharge the collected loads at the will of the driver.

Figure 5:
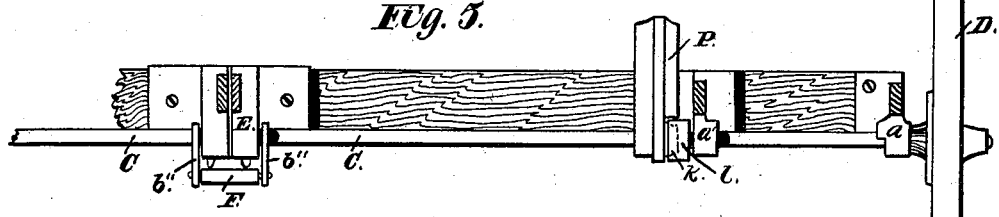
Figure 6:
Figure 7:
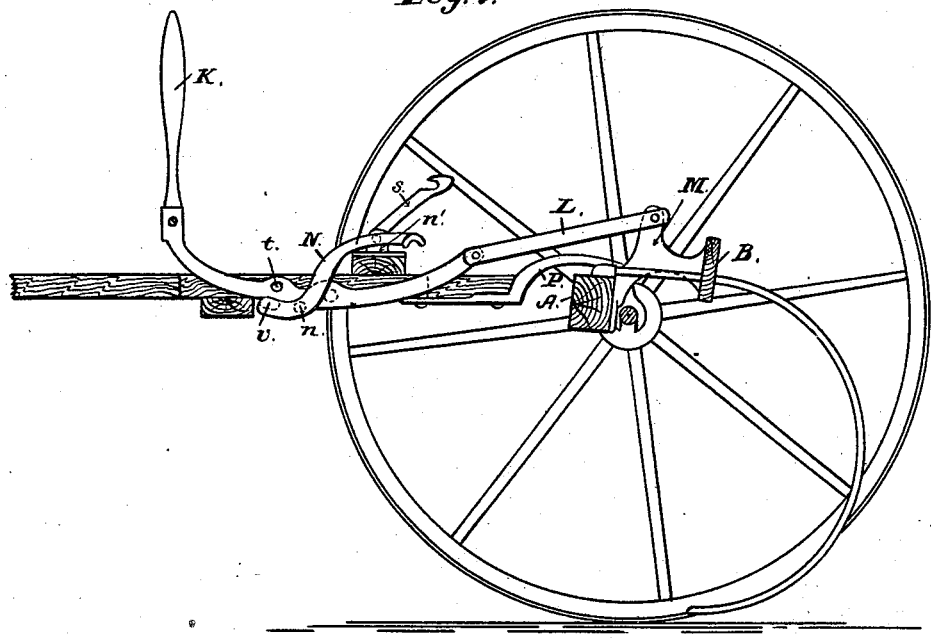

In the accompanying drawings, Figure 1, Sheet 1, is a plan view of my improved rake. Fig. 2, Sheet 1, is a side elevation of the same through the line $x\,x$ of Fig. 1. Fig. 3, Sheet 1, is an inverted perspective view of my improved tooth-fastener. Fig. 4, Sheet 1, is a perspective view of the end of the rake-tooth. Fig. 8, Sheet 1, is a side elevation of the automatic dumping locking devices. Fig. 5, Sheet 2, is a rear view of a portion of the rake-head and divided shaft through the line $y\,y$ of Fig. 1. Fig. 6, Sheet 2, is an enlarged side elevation of the thill-coupling. Fig. 7, Sheet 2, is a side elevation of the rake through the line $z\,z$ of Fig. 1.

The novelty of my invention consists, first, in a spring-axle keyed at each end to the carriage or supporting wheels, and divided at or near its middle, so as to form two shafts, upon the abutting ends of which are keyed small pinions or ratchet-wheels, which, by springing the axle, are caused to engage with segmental gears or other devices connected to the rake-head, whereby upon the advance or turning of the machine the rake-head, with the teeth attached, is tilted, and the collected load discharged; second, in the construction and arrangement of mechanism whereby the driver, by pressing his foot upon a treadle-lever, causes the divided axle to spring and effect its engagement with the rake-head for the purpose of tilting it as the rake advances or turns forward, and by means of which, when the teeth have been elevated sufficiently to discharge the collected loads, the automatic disengagement of the axle and the rake-head is effected, and the teeth fall back to raking position; third, in an improved tooth-fastening device, and in other details, all as will be herewith set forth and specifically claimed.

A is the rake-head, to which the teeth are attached at their forward end. Running parallel to the rake-head at a suitable distance to its rear, and elevated slightly above it, and rigidly secured thereto at each end and at intermediate points by the braces or brackets $a\,a'$, is the transverse beam B, having a series of vertical slots, through which the teeth pass. These two beams thus connected may be said to constitute the frame-work of the rake, upon which the raking devices are secured and supported. Through bearings in the brackets $a\,a'$ passes the axle or shaft C, to which at each end are secured and keyed the carriage-wheels D D, which, in turning, rotate the axle with them, and independently of the rake-head.

The axle is a rod of wrought-iron or of tempered steel, of sufficient size and strength to support the weight of the driver and the rake. It is divided in two at or near the center, so as to form two separate shafts, one attached to each wheel and turning independently of each other. On each of the abutting ends of this axle is keyed a pinion-wheel, $b\,b$.

At or near the center of the rake-head, and secured thereto and to the cross-beam B, is the housing E, which incloses the ends of the axle, with the pinions $b\,b$ thereon, and other of the devices, whereby the dumping of the rake is effected. This housing is most conveniently cast in two pieces, corresponding to each other in shape and size. In the forward upper part of this housing, pivoted at one end, and eccentrically to its inner walls, are the segmental gears or racks $e\,e$, one for each of the pinions $b\,b$. Upon the rear outer face of each rack is a pin, which is confined and moves in a segmental slot, $e'$, in the wall of the housing, the purpose of which is to prevent irregularity of motion endwise or sidewise in the racks and to limit their downward motion.

Beneath the racks $e\,e$ in each wall of the housing is a vertical slot, $e''$, Fig. 2, through which pass the abutting ends of the axle C. These slots are of such a size and are so situated that when the ends of the axle are resting in place the pinions $b\,b$ are clear of the racks *e e;* but when the former are raised the two come in contact and mesh together.

Pivoted in bearings on the under side of the rake-head, at its center, so as to be in line with the housing E, is the curved lever F, of the shape shown, whose lower end is connected by links to each of the abutting ends of the axle, at a point just outside the housing. These connecting-links *b'*, though embracing the axle securely, should yet permit it to revolve easily. The lever F being curved as it is, the effect of moving its top end forward is to raise its lower end, and so elevate the abutting ends of the axle C. Upon the forward part of this lever are formed shoulders or projections *f*, as shown.

To the top of the rake-head, at its center, is pivoted the segmental slotted drop-lever or gravitating latch G. In the drawings this lever is shown pivoted in the upper fore part of the housing, but its bearing might be in a separate casting upon the rake-head at that point.

About the center of the lever G, on its under side, are catches or notches *i*, formed to lock with the detents *f* on the lever F. The lower end of the lever G is connected by a chain, *h*, to the curved connecting-link H, or it might be directly connected to the foot-lever I. The curved link H connects the top of the lever F to the foot-lever I, which latter is pivoted, as shown, to the bracket *g*. As a result of this mode of connection, it will be observed that upon the forward motion of the foot-lever I the top of the lever F will also move forward. When the latter has reached a certain point in its forward progress the shoulders *f* on its sides will pass under the notches *i* on the latch G, and the said latch being pivoted only at its top its weight will cause it to drop until the notches catch in the shoulders and a lock is effected between the two levers. To disengage them it will then be necessary to raise or thrust forward the lower end of the latch G, force thus applied tending to release the shoulder *f* from the notches in said latch. As will be hereinafter explained, this force is supplied by the tilting or forward rotation of the rake-head, which, as it carries the bottom of the lever G backward, stretches the chain *h* taut, and causes it to raise or pull forward the bottom of the said lever.

The dumping of the rake is effected thus: When a sufficient load is collected on the teeth the driver from his seat presses upon the foot-lever I. This action pulls forward the top of the lever F and raises its bottom end, the weight of the collected load holding the teeth down and keeping the rake-head from tilting. This raises the abutting ends of the axle. This axle is elastic enough to spring and bend upward at the center, its bearings *a a a' a'* being set far enough from the center to permit this without too great a strain, the distance between *a* and *a'* being about one-sixth of the entire length of the rake-head.

When the ends of the axle are thus raised at the center, the pinions *b b* are brought into gear with the racks *e e*, and a lock is formed between the two. But as these pinions rotate with the axle and carriage-wheels, and as the racks are secured to the rake-head, the forward motion of the carriage-wheels and consequent forward rotation of the pinions *b b* force the rake-head to gradually rotate in the same direction, and so to raise the teeth from the ground. This rotation of the rake-head carries backward the lower end of the lever G, while it moves forward the top of the lever F, and consequently the connecting-link H.

Now, as one end of the chain *h* is fastened to the bottom of the lever G and moves backward with it, while its other end being secured to the link H is pulled forward, the effect is to stretch this chain to exert an upward strain upon the lower end of the lever G, and so to release said lever from its lock with the lever F by disengaging the notches *i* on the one from the projections *f* on the other.

The abutting ends of the axle being thus released and relieved of the upward pressure exerted by the bottom of the lever F resume by the elasticity of the axle their former place in line with the outer ends of the axle, so that the pinions *b b* become disengaged from the racks *e e*, allowing the teeth by their own weight to fall back to a raking position and the rake-head to tilt back again to its original place.

It will be observed that, as the axle is in two parts, and as one part turns with each carriage-wheel independently of the other part, the rake-head can be tilted and the load discharged while the rake is being turned around and only one of the carriage-wheels is revolving.

It is to be further noted that, owing to the peculiar manner in which the gears *e e* are pivoted, with their rear ends playing freely up and down, the rake may be backed without tilting the teeth and without disturbing the lock between the axle and the rake-head.

Instead of this automatic arrangement, the rake-head may be also dumped by means of the hand-lever K, pivoted, as shown, to the thill-bars, and connected by the link L to the bracket M, rigidly fastened to the rake-head.

In order to break the fall of the teeth when the load is dumped by either of the above-described arrangements, and to lessen the violence of the jar, I provide a curved foot-lever, N, bent, as shown, at its lower end, and pivoted at some point, as *n*, such that when the driver's foot presses down upon the upper rear end of the lever its forward lower end will be elevated a couple of inches above the front thill-bar, *p*. By this means when the teeth fall and the lever K is thrust forward and downward by the backward rotation of the rake-head, said lever in its descent will strike against the bent portion, *v*, at the lower end of the lever N, and will so be arrested in its downward progress, and can then be let down gently as far as it will go by the driver removing the pressure from the lever N. Of course the arrest of the lever K will also arrest the tilting of the rake-head and the fall of the teeth.

Pivoted in a bearing, $n'$, upon the rear cross-bar is a hooked arm, $s$, Fig. 7, which, when the hand-lever K is drawn back, can be made to engage with a stud, $t$, projecting laterally from said lever, as shown in Figs. 1 and 7. By means of this hook the hand-lever can be locked back to hold the rake-teeth up when it is desired to transport the rake from place to place.

P is the thill-coupling which I use to attach the thills to the axle. It consists of the straight flat strip whereby the coupling is screwed to the bottom of the thill and of an arched or segmental piece in the rear, which passes over the rake-head, and has at its end a vertical slot, $o$, of a size to easily slip over and embrace the axle. This end of the coupling is shaped, as shown in Figs. 5 and 6, with a neck or flange, $k$, on the outer edge of the slot on the side next to the carriage-wheels. In Fig. 5 this neck is shown in dotted lines.

To secure the coupling to the axle the loose collar $l$ upon the latter is made to embrace the neck $k$ when the couplings are in place on the axle with the slots $o$ embracing it. The brackets $a'$ serve to confine these collars in this position. By this means the couplings are prevented from being removed from the axle by confining it within the slots $o$, though without binding. The collars $l$ should fit loosely on the axle and allow sufficient vertical play when the axle is sprung in the center.

By this means I provide a simple, efficient, and expeditious mode of attaching the thills to the axle, particularly fitted for that class of rakes in which the axle in dumping is sprung up in the center and so deflected out of a straight line.

I secure the teeth to the rake-head in the following manner: The forward end of each tooth is bent to form a loop or eye triangular in shape, as in Fig. 4. Over this end of the tooth I place a hollow cap, R, Fig. 3, cast, as shown, with an inwardly-projecting central protuberance or knob corresponding in shape with the eye of the tooth, and of a size to fit snugly therein. When this cap is placed over the end of the tooth the central projection will be inserted within its eye. Both cap and tooth are then secured by a wood-screw passing through a central aperture in the cap and through the eye of the tooth into the rake-head. This fastening, while preventing too free a play vertical or lateral in the teeth, does not bind so closely upon their ends as to cause any strain when the teeth are raking, and can also be easily and quickly removed when it is necessary to insert a new tooth.

S is the cleaner-bar secured to the beams T T, which are hinged at $t'$ to the stationary uprights V V. At each end of the bar S, and, if desirable, also at intermediate points, pivoted in loops $s'$ depending therefrom, are pulleys $q$ $q$, grooved to slide easily upon the rake-teeth.

The bar S is also provided with a series of cleaner sticks or teeth. By this means when the rake-head is tilted forward for dumping the bar S is raised, and the rake-teeth passing forward beneath it, and the cleaner-sticks passing between them as they advance, the hay is forced off and the load discharged. The pulleys $q$ $q$ greatly facilitate the passage of the rake-teeth under the bar S, and the hinges at $t'$ enable the latter to be easily raised by the teeth for the same purpose.

I am aware that it is not new in horse hay-rakes to employ a divided shaft to the outer ends of which the carriage-wheels are attached.

Having thus fully described my invention, what I claim, and desire to secure by Letters Patent, is as follows:

1. In a horse hay-rake, a divided spring-shaft to which the carriage-wheels are secured, combined with the rake-head and connecting mechanism, whereby upon vibrating said spring-shaft it may be coupled with and cause the rotation of the rake-head and the elevation of the teeth while the rake is either advancing or turning, substantially as set forth.

2. The divided shaft having secured upon its outer ends the carriage-wheels and upon its abutting ends pinions engaging with gearing connected with the rake-head, whereby upon vibrating the shaft the engagement of said shaft with the rake-head is effected, to cause the rotation of the latter as the rake advances or turns, substantially as herein set forth.

3. The divided shaft secured to the wheels and revolving therewith, having on its inner ends pinions, and so arranged that said inner ends may be vibrated at the will of the operator to effect the engagement of said shaft with the rake-head, whereby the rotation of the latter is caused, substantially as set forth.

4. The divided shaft provided on its abutting ends with pinions, in combination with eccentrically-pivoted gears or racks connected to the rake-head, whereby upon vibrating the abutting ends of the shaft, so as to cause the engagement of the pinions with the racks, the rake-head will be tilted while the rake advances or turns, and whereby the racks will become automatically disengaged when the rake is backed, substantially as set forth.

5. The housing E, having on opposite sides slots through which the abutting ends of the divided shaft pass, and having also on opposite sides slots into which projections from the segmental gears $e$ $e$ extend, and containing said gears pivoted therein, whereby said housing, in addition to its ordinary function as a housing, limits the downward movement of the gears $e$ $e$, and permits of their disengagement from the pinions when the latter revolve backward, as specified.

6. The lever F, pivoted to the rake-head, and connected at one end to the abutting ends of the divided shaft C and at the other end to a lever within reach of the driver, whereby upon operating such last-named lever the divided shaft is vibrated, so as to cause its engagement with the rake-head, as set forth.

7. The combination, with the lever F, pivoted as described, and connected to the divided shaft and to the operating-lever I, of the gravitating latch G, pivoted at one end upon the rake-head and provided with catches $i$, engaging with detents $f$ upon the lever F, substantially as and for the purpose specified.

8. In combination with a divided shaft, C, and rake-head A, coupling mechanism consisting of a lever for vibrating the divided shaft, a gravitating latch, an operating-lever, and disconnecting links or chain, whereby upon shifting the operating-lever the rake-head, as the machine advances or turns, is tilted to elevate the teeth, and is then automatically released and returns the teeth to raking position, as set forth.

9. A tooth-fastener for horse hay-rakes, consisting of a cap having a triangular groove or recess on its under surface to receive the triangular eye of the rake-tooth, whereby lateral play of the tooth is prevented, as specified.

Witness my hand this 12th day of November, A. D. 1878.

WILLIAM S. ARCHER.

Witnesses:
P. H. GUNCKEL,
CHAS. M. PECK.